(12) United States Patent
Gulick (10) Patent No.: US 6,836,813 B1
(45) Date of Patent: Dec. 28, 2004

(54) SWITCHING I/O NODE FOR CONNECTION IN A MULTIPROCESSOR COMPUTER SYSTEM

(75) Inventor: Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 460 days.

(21) Appl. No.: 09/998,758

(22) Filed: Nov. 30, 2001

(51) Int. Cl.$^7$ .............................................. G06F 13/36
(52) U.S. Cl. ........................ 710/306; 710/311; 710/312
(58) Field of Search ................................ 710/305, 306, 710/311, 312, 313, 314, 315, 316, 317, 260

(56) References Cited

U.S. PATENT DOCUMENTS

| | | | |
|---|---|---|---|
| 5,533,198 A | | 7/1996 | Thorson |
| 5,754,789 A | | 5/1998 | Nowatzyk et al. |
| 5,991,824 A | * | 11/1999 | Strand et al. .................. 710/1 |
| 6,085,276 A | | 7/2000 | VanDoren et al. |
| 6,411,627 B1 | | 6/2002 | Hullett et al. |
| 6,424,658 B1 | * | 7/2002 | Mathur ....................... 370/429 |
| 6,604,161 B1 | * | 8/2003 | Miller ........................ 710/260 |

FOREIGN PATENT DOCUMENTS

| | | |
|---|---|---|
| EP | 0 801 352 | 10/1997 |
| WO | 01/18654 | 3/2001 |
| WO | 01/18661 | 3/2001 |

OTHER PUBLICATIONS

U.S. Appl. No. 09/399,281, entitled "Virtual Channels and Corresponding Buffer Allocations for Deadlock–Free Computer System Operation", filed Sep. 17, 1999.
U.S. Appl. No. 09/978,349, entitled "Computer System I/O Node", filed Oct. 15, 2001.
U.S. Appl. No. 10/093,146, entitled "A Peripheral Interface Circuit for an I/O Node of a Computer System", filed Mar. 7, 2002.
International Search Report for PCT/US 02/28985, mailed Feb. 28, 2003, 7 pages.

* cited by examiner

*Primary Examiner*—Tim Vo
(74) *Attorney, Agent, or Firm*—Meyertons Hood Kivlin Kowert & Goetzel, P.C.; B. Noël Kivlin; Stephen J. Curran (57) ABSTRACT

A switching I/O node for connection in a multiprocessor computer system. An input/output node switch includes a bridge unit and a packet bus switch unit implemented on an integrated circuit chip. The bridge unit may receive a plurality of peripheral transactions from a peripheral bus and may transmit a plurality of upstream packet transactions corresponding to the plurality of peripheral transactions. The packet bus switch may receive the upstream packet transactions on an internal point-to-point packet bus link and may determine a destination of each of the upstream packet transactions. The packet bus switch may further route selected ones of the upstream packet transactions to a first processor interface coupled to a first point-to-point packet bus link and route others of the upstream packet transactions to a second processor interface coupled to a second point-to-point packet bus link in response to determining the destination each of the upstream packet transactions.

31 Claims, 5 Drawing Sheets

SWITCHING I/O NODE FOR CONNECTION IN A MULTIPROCESSOR COMPUTER SYSTEM

BACKGROUND OF THE INVENTION

1. Field of the Invention

This invention relates to multiprocessor computer system I/O nodes and, more particularly, to switching I/O nodes.

2. Description of the Related Art

Computer systems employing multiple processing units hold a promise of economically accommodating performance capabilities that surpass those of current single-processor based systems. Within a multiprocessing environment, rather than concentrating all the processing for an application in a single processor, tasks may be divided into groups that may be handled by separate processors. The overall processing load is thereby distributed among several processors, and the distributed tasks may be executed simultaneously in parallel. The operating system software divides various portions of the program code into the separately executable threads, and typically assigns a priority level to each thread.

Personal computers (PCs) and other types of computer systems have been designed around a shared bus system for accessing memory. One or more processors and one or more input/output (I/O) devices may be coupled to the memory through the shared bus. The I/O devices may be coupled to the shared bus through an I/O bridge which manages the transfer of information between the shared bus and the I/O devices, while processors are typically coupled directly to the shared bus or coupled through a cache hierarchy to the shared bus. A typical multiple processor computer system is described below in conjunction with the description of prior art FIG. 1.

Figure 1:
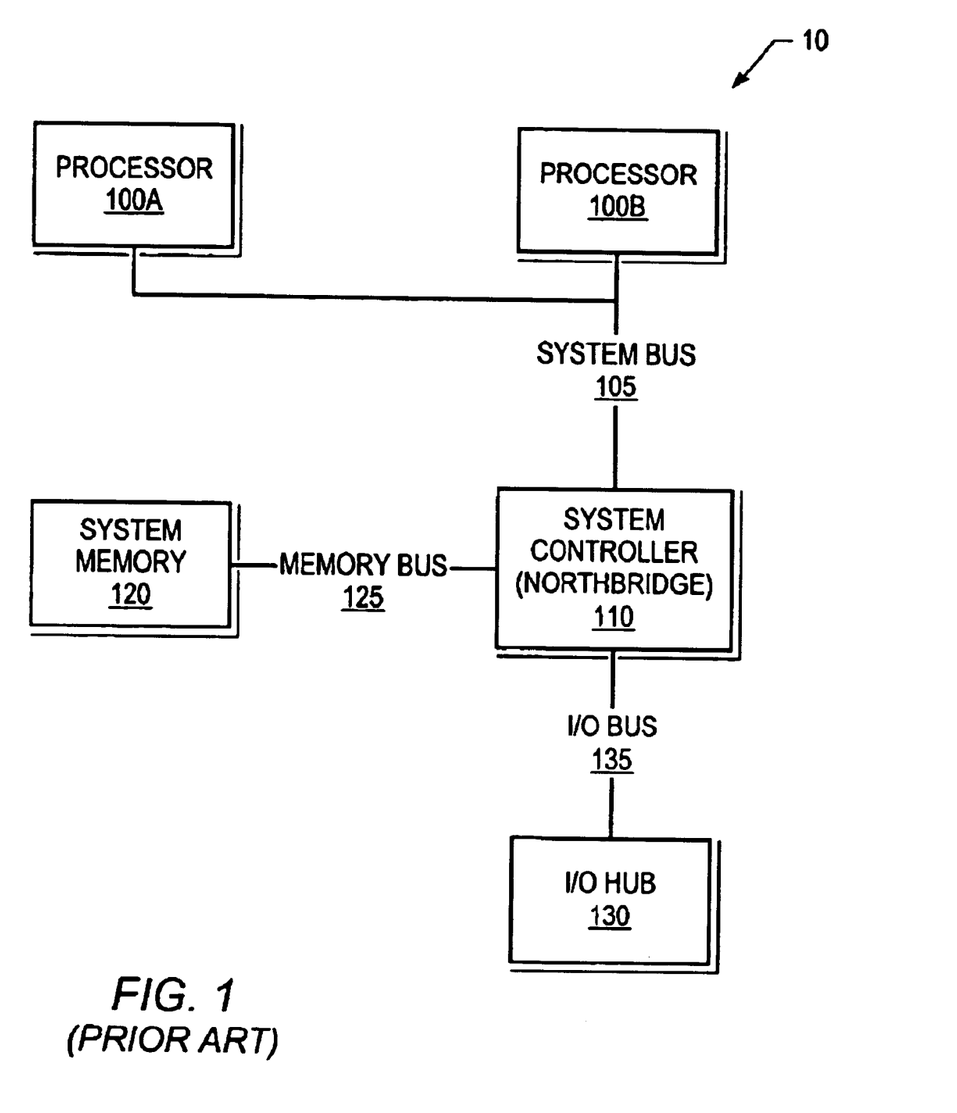
FIG. 1 is a block diagram of one embodiment of a multiprocessor computer system using a shared bus.

Turning to FIG. 1, a block diagram of one embodiment of a multiprocessor computer system is shown. The multiprocessor computer system includes processor units 100A–100B, a system controller 110 coupled to processor units 100A–100B via a system bus 105 and a system memory 120 coupled to system controller 110 via a memory bus 125. In addition, system controller 110 is coupled to an I/O hub 130 via an I/O bus 135.

The multiprocessor computer system of FIG. 1 may be symmetrical in the sense that all processing units 100A–100B may share the same memory space (i.e., system memory 120) and access the memory space using the same address mapping. The multiprocessing system may be further symmetrical in the sense that all processing units 100A–100B share equal access to I/O hub 130.

In general, a single copy of the operating system software as well as a single copy of each user application file may be stored within system memory 120. Each processing unit 100A–100B may execute from these single copies of the operating system and user application files. Although the processing cores (not shown) may be executing code simultaneously, it is noted that only one of the processing units 100A–100B may assume w mastership of system bus 105 at a given time. Thus, a bus arbitration mechanism, within system controller 110, may be provided to arbitrate concurrent bus requests of processing units 100A–100B to grant mastership to one of processing units 100A–100B based on a predetermined arbitration algorithm. A variety of bus arbitration techniques are well known.

In addition to any limitations that may be present due to system bus arbitration, the shared bus (e.g. system bus 105) used above in the computer system of FIG. 1 may suffer from drawbacks such as limited bandwidth. As additional processors are attached to the shared bus, the multiple attachments present a high capacitive load to a device driving a signal on the bus, and the multiple attach points present a relatively complicated transmission line model for high agencies. Accordingly, the operating frequency may be lowered.

To overcome some of the drawbacks of a shared bus, some computer systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or source node which transmits the packet and a destination or "target" node which receives the packet. When a packet reaches the target node, the target node accepts the information conveyed by the, pack et and processes the information internally. A node located on a communication path between the source and target nodes may relay or forward the packet from the source node to the target node.

Figure 2:
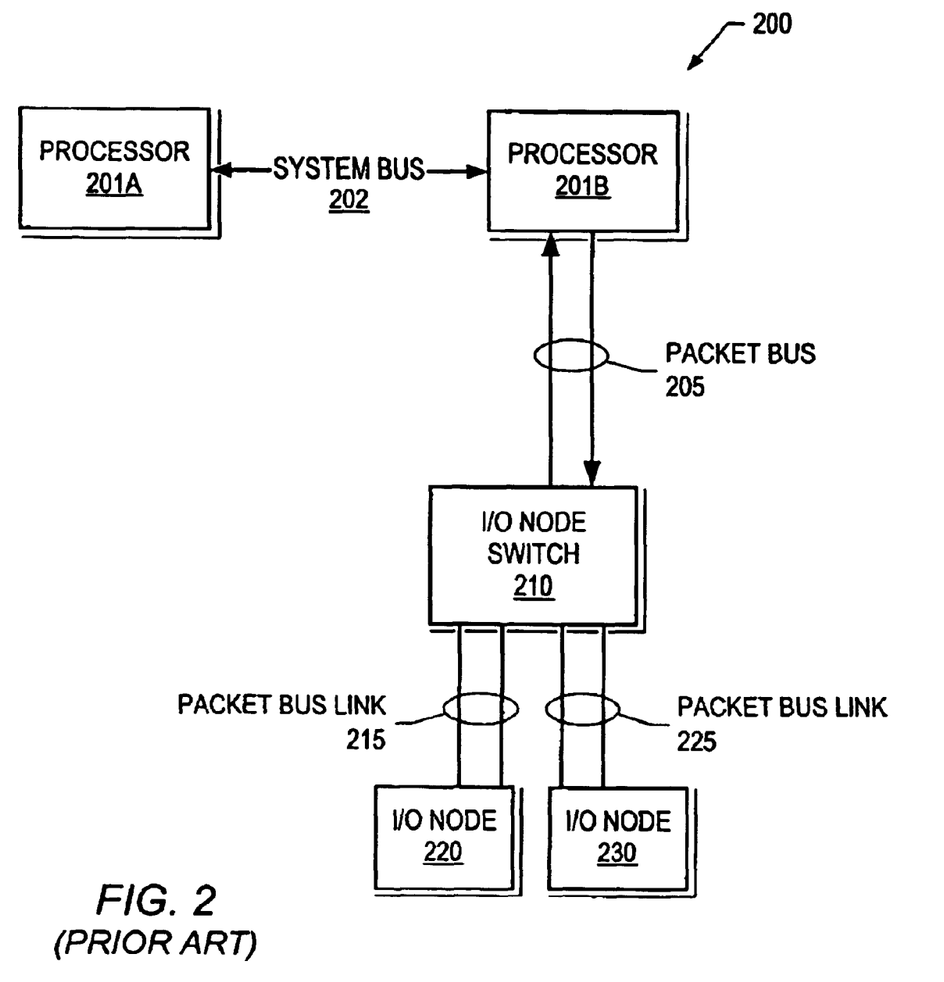
FIG. 2 is a block diagram of one embodiment of a multiprocessor computer system having multiple downstream packet bus links switched to a single upstream packet bus link.

Referring to FIG. 2, a multiprocessor computer system having multiple downstream packet bus links switched to a single upstream packet bus link is shown. Multiprocessor computer system 200 includes processor 201A and processor 201B interconnected by a system bus 202. Processor 201B is connected to an I/O node switch 210 by a packet bus link 205. I/O node switch 210 is further connected to I/O node 220 via a second packet bus link 215. Further, node switch 210 is connected to an additional I/O node 230 via packet bus link 225.

It is noted that processors 201A and 201B may operate in substantially the same way as processors 101A and 101B of FIG. 1. However, the I/O connections are different in FIG. 2. I/O node switch 210 may provide a switching mechanism for communications directed from processor 201A or 201B to either of I/O nodes 220 or 230. In this type of system, processor 201 may include a host bridge (not shown) to facilitate communication with I/O nodes 220 and 230. In addition, processor 201A may communicate with I/O nodes 220 and 230 through processor 201B. Although a system connected in this way may provide a better multiprocessing solution than the multiprocessor system shown in FIG. 1 due to the use of packet buses in FIG. 2, there may still be drawbacks. For example, transactions originating in or targeting processor 201A may first pass through processor 201B, possibly incurring latency penalties.

SUMMARY OF THE INVENTION

Various embodiments of a switching I/O node for connection in a multiprocessor computer system are disclosed. In one embodiment, an input/output node switch for a multiprocessor computer system includes a bridge unit implemented on an integrated circuit chip. The bridge unit may be coupled to receive a plurality of peripheral transactions from a peripheral bus, such as a PCI bus for example, and may be configured to transmit a plurality of upstream packet transactions corresponding to the plurality of peripheral transactions. The input/output node switch also includes a packet bus switch unit implemented on the integrated circuit chip that may be coupled to receive the plurality of upstream packet transactions on an internal point-to-point packet bus link and configured to determine a destination of each of the plurality of upstream packet transactions. The packet bus switch unit may be further configured to route selected ones of the plurality of upstream packet transactions to a first processor interface coupled to a first point-to-point packet bus link and to route others of the plurality of upstream packet transactions to a second processor interface coupled to a second point-to-point packet bus link in response to determining the destination each of the plurality of upstream packet a transactions.

In one specific implementation, the input/output node switch further includes a first transceiver unit and a second transceiver unit implemented on the integrated circuit chip. The first transceiver unit may be coupled to receive the selected ones of the plurality of upstream packet transactions and to transmit the selected ones on first point to point packet bus link. The second transceiver unit may be coupled to receive the selected other ones of the plurality of upstream packet transactions and to transmit the selected other ones on the second point-to-point packet bus link. Each point-to-point packet bus link may be a HyperTransport™ bus link.

In one specific implementation, the packet bus switch unit may be configured to determine the destination of each of the plurality of upstream packet transactions using a programmable look up table.

In another specific implementation, the packet bus switch unit may be configured to determine the destination of each of the plurality of upstream packet transactions using available buffer space counts corresponding to upstream devices, such as processors, coupled to the first and the second external packet bus links.

In yet another specific implementation, the packet bus switch unit may be configured to decode an address associated with each of the plurality of upstream packet transactions. In a further specific implementation, the packet bus switch unit may be configured to block additional ones of the plurality of upstream packet transactions dependent upon the address.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 3:
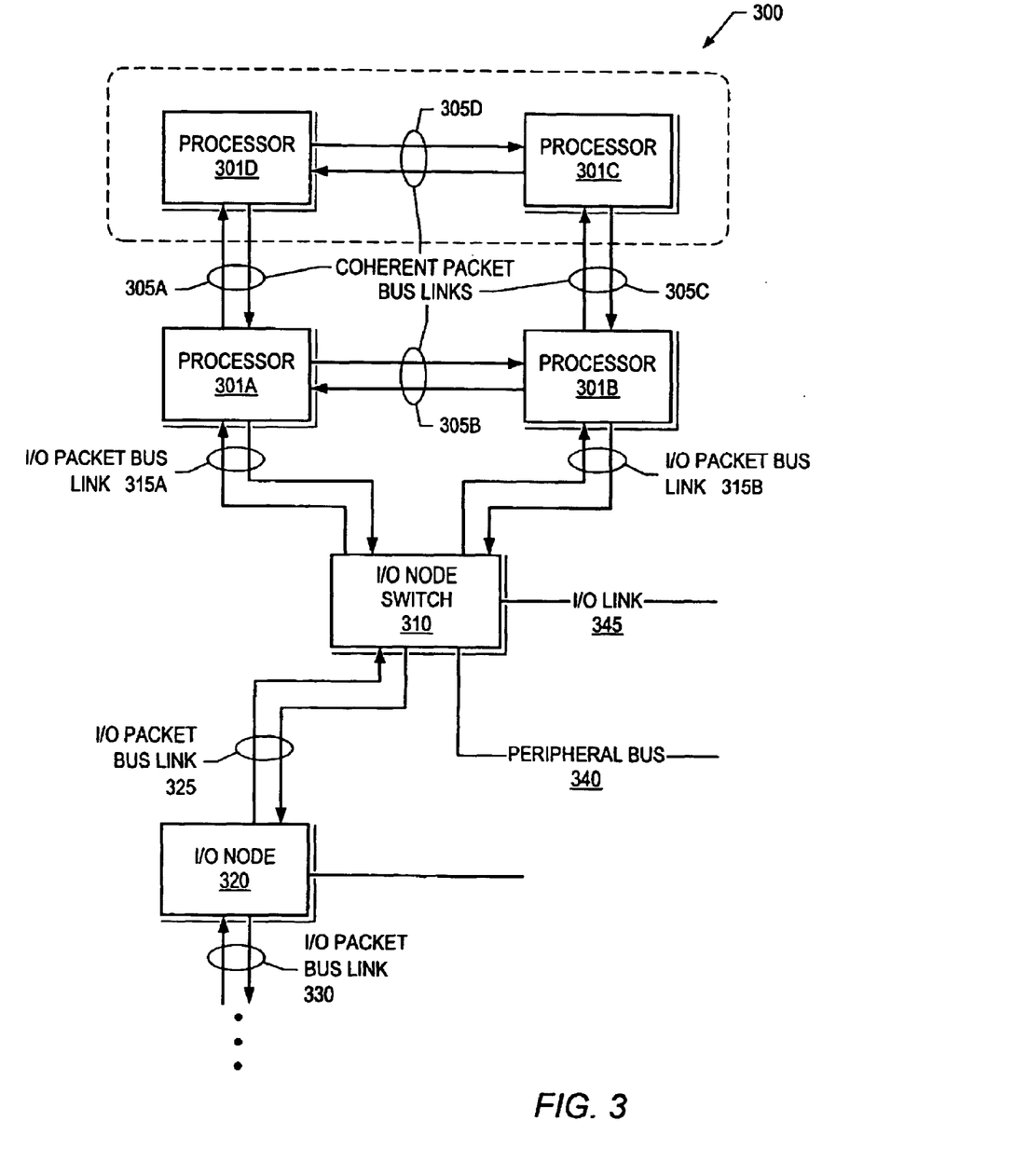
FIG. 3 is a block diagram of one embodiment of a multiprocessor computer system having multiple upstream packet bus links.

Turning now to FIG. 3, a block diagram of a multiprocessor computer system having multiple upstream packet bus links is shown. Multiprocessor computer system 300 includes processors 301A through 301D coupled to an I/O node switch device 310 through a pair of I/O packet bus links 315A and 315B, respectively. Processors 301A–D are coupled together via separate coherent packet bus links 305A–D. I/O node switch 310 is shown connected to a peripheral bus 340 and an I/O link 345. I/O node switch 310 is further coupled to an I/O node 320 via an I/O packet bus link 325. I/O node 320 is coupled to another I/O packet bus link 330 which may be connected to another I/O node (not shown). It is noted that other embodiments are contemplated which may include different configurations of the components shown in multiprocessor computer system 300. For example, it is contemplated that in other embodiments, other numbers of processors may be connected to I/O node switch 310 through additional I/O packet bus links (not shown). In addition, I/O link 345 may be connected to a device within the same or a different network as multiprocessor computer system 300.

In the illustrated embodiment, each link of coherent packet bus 305 is implemented as sets of unidirectional lines (e.g. lines 305B are used to transmit packets from processor 301A to processor 301B and lines 305C are used to transmit packets from processor 301BB to processor 301C). Other sets of lines 305A and D are used to transmit packets between other processors as illustrated in FIG. 3. The coherent packet interface 305 may be operated in a cache coherent fashion for communication between processing nodes ("the coherent link"). Further, I/O packet bus 315 may be operated in a non-coherent fashion for communication between I/O nodes and between I/O nodes and a processor such as processor 301A ("the non-coherent link"). The non-coherent links may also be implemented as sets of unidirectional lines (e.g. lines 315A are used to transmit packets from processor 301A to I/O node switch 310 and lines 315B are used to transmit packets from processor 301B to I/O node switch 310). The interconnection of two or more nodes via coherent links may be referred to as a "coherent fabric". Similarly, the interconnection of two or more nodes via non-coherent links may be referred to as a "non-coherent fabric". It is noted that a packet to be transmitted from one processor to another may pass through one or more intermediate nodes. For example, a packet transmitted by processor 301A to processor 301C may pass through either processor 301B or processor 301D as shown in FIG. 3. Any suitable routing algorithm may be used. As denoted by the dashed line surrounding processor 301C–D, other embodiments of multiprocessor computer system 300 may include more or fewer processors than the embodiment shown in FIG. 3.

In the illustrated embodiment, each of processors 301A–D is an example of an x86 architecture processor such as an Athlon™ microprocessor. It is contemplated however, that other suitable processors may be used. In addition, I/O packet bus links 315A–B and 325 are exemplary links of a high-speed point-to-point packet interface and are compatible with HyperTransport™ technology. Further, I/O link 345 is an exemplary connection such as an Ethernet or an Infiniband™ connection. Peripheral bus 340 is an example of any suitable peripheral bus such as a Peripheral Component Interconnect (PCI) bus, or an Extended Peripheral Component Interconnect (PCI-X) bus, for example.

In a multiprocessor computer system such as multiprocessor computer system 300, a single copy of the operating system software as well as a single copy of each user application file may be stored within a system memory (not shown). Each of processors 301A–301D may execute from these single copies of the operating system and user application files and may be executing code simultaneously.

In the illustrated embodiment, processors 301A and 301B may each include a host bridge (not shown) containing an interface to I/O packet bus links 305A and 305B, respectively. Although it is contemplated that in other embodiments, processors 301C and 301D may also include host bridges and be connected to additional I/O packet bus links. As will be described in greater detail below in conjunction with the descriptions of FIG. 4 and FIG. 5, I/O node switch 310 may receive multiple packet transactions from downstream sources and route those transactions to multiple upstream destinations, such as processors 301A–B. As used herein, the term 'upstream' is meant to refer to transactions which flow in a direction toward a processor such as processor 301A, or a host bridge within the processor. The term 'downstream' is meant to refer to transactions which flow in a direction away from the processor or the host bridge within the processor.

In general, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets a and response packets. It is noted that other embodiments are contemplated which include other types of packets.

I/O node switch 310 may receive upstream packet transactions from multiple downstream sources such as peripheral bus 340, network link 345 and I/O packet bus 325 for example. The packet transactions each may typically include a header having an address encoded within it. I/O node switch 310 may decode each of the destination addresses of the packet transactions and route those transactions depending upon the decoded address. I/O node switch 310 may also receive downstream packet transactions originating from processors 301A–D. I/O node switch 310 may again decode the destination address of each packet transaction and route the packet transactions accordingly.

Figure 4:
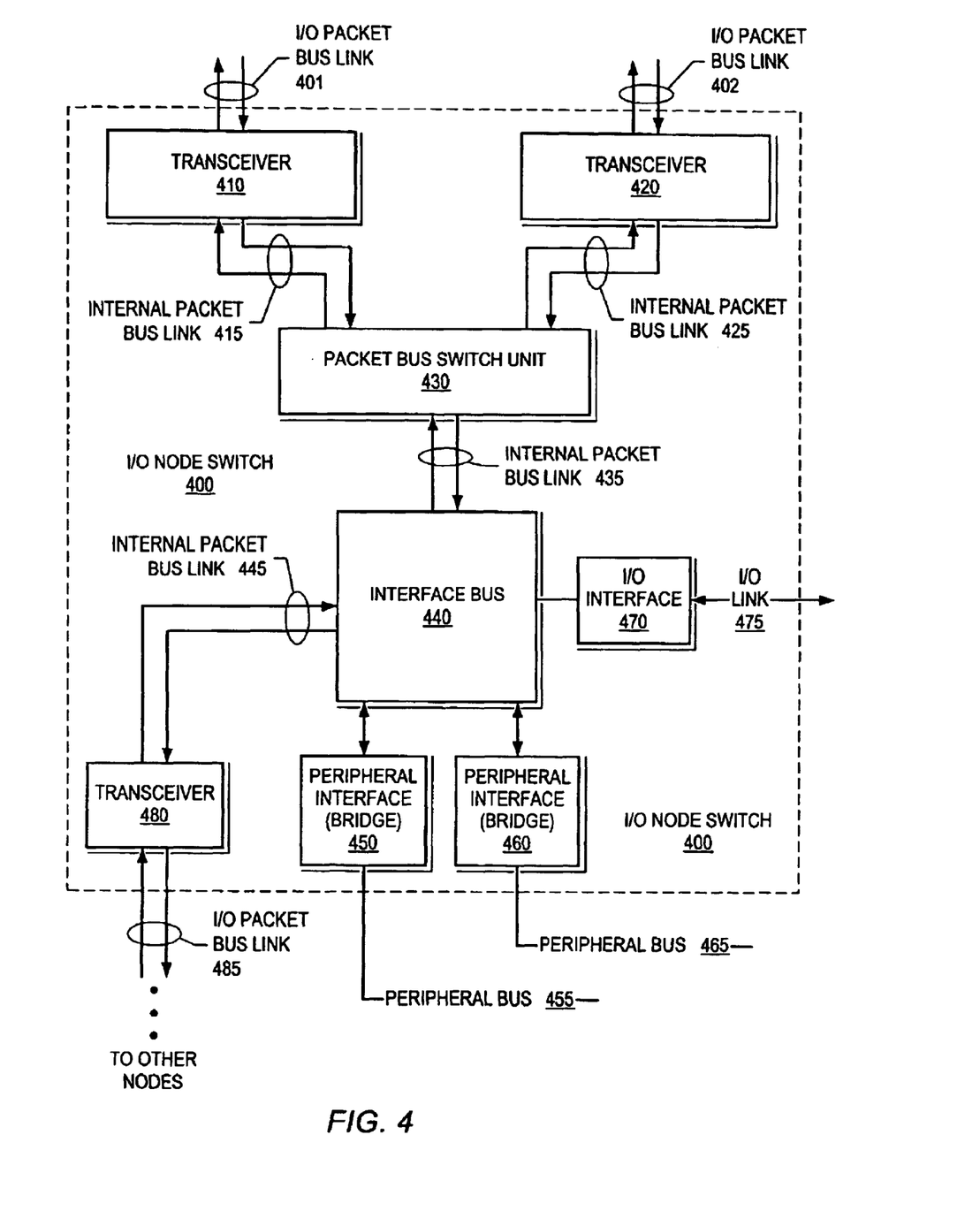
FIG. 4 is a block diagram of one embodiment of an I/O node switch.

Referring to FIG. 4, a block diagram of one embodiment of an I/O node switch is shown. I/O node switch 400 includes a pair of upstream transceivers 410 and 420 coupled to I/O packet bus links 401 and 402, respectively. I/O packet bus links 401 and 402 may be coupled to upstream devices such as processors 301A–B of FIG. 1, for example. Transceivers 410 and 420 of FIG. 4 are also coupled to packet bus switch 430 via internal packet bus links 415 and 425, respectively. Packet bus switch 430 is coupled to interface bus 440 by internal packet bus link 435. Interface bus 440 is coupled to downstream transceiver 480 via internal packet bus link 445. Transceiver 480 is coupled to I/O packet bus link 485 which may be connected to another I/O node or other device (not shown). Interface bus 440 is also coupled to an I/O interface 470 and to peripheral interface 450 and 460. Peripheral interface 450 and 460 are coupled to peripheral buses 455 and 465, respectively. I/O interface 470 is coupled to I/O link 475. It is noted that although the present embodiment depicts two upstream transceivers connected to two I/O packet bus links, it is contemplated that other embodiments may include other suitable numbers of upstream transceivers coupled to other suitable numbers of upstream I/O w packet bus links.

It is noted that I/O interface 470 may be an integrated I/O controller and may include circuitry which implements a particular I/O device such as a Gigabit Ethernet™ controller or an Infiniband™ port controller, for example. In such embodiments, I/O link 475 may be an exemplary connection such as an Ethernet or an Infiniband™ connection. Peripheral buses 455 and 465 are examples of any suitable peripheral bus such as a Peripheral Component Interconnect (PCI) bus, or an Extended Peripheral Component Interconnect (PCI-X) bus, for example.

Transceivers 410 and 420 may be configured to receive downstream packet transactions and to transmit upstream packet transactions on I/O packet bus links 401 and 402, respectively. Transceivers 410 and 420 may include receive and transmit buffer circuits (not shown) for storage of pending packet transactions. Transceivers 410 and 420 may also include I/O driver circuitry (not shown) for transmitting the packet transactions upon I/O packet bus links 401 and 402.

Packet switch unit 430 may be configured to receive upstream packet transactions upon internal packet bus link 435, decode an address of each transaction and determine which, if any, of the upstream paths to route each transaction. As will be described in greater detail below, if a given transaction contains an address which is not associated a with one of the upstream internal packet bus links of packet bus switch 430, the packet transaction may be sent back downstream. Alternatively, the packet transaction may be sent upstream regardless of whether the address corresponds to any of the upstream internal packet bus links of packet bus switch 430.

Interface bus 440 may include internal packet bus architecture and circuitry (not shown) necessary to interconnect each of the internal packet bus links 435 and 445, the peripheral interfaces 455 and 465 and the I/O interface 470. For example, interface bus 440 may include interface ports (not shown) for internal packet bus link 435, I/O interface 470, peripheral interface 450 and 460 and for internal packet bus link 445. Each interface port may include an address filter which is capable of claiming a given packet transaction having an address that matches a particular filter. Thus, interface bus 440 may be configured to provide peer-to-peer traffic support between each peripheral interface, I/O interface and internal packet bus link 445. For example, a packet transaction directed to peripheral interface 460 is transmitted upstream to interface bus 440 by peripheral interface 450. The packet transaction header may be decoded by each of the interface ports that are connected to interface bus 440. The decoded address matches only the address filter of peripheral interface 460 and is thus claimed by peripheral interface 460.

A packet transaction sent upstream by a given interface may not match any of the address filters in the interface ports. In such a case, packet bus switch 430 may cause the unclaimed packet transaction to be sent back downstream to the originator of the transaction. In addition, an error message may accompany the transaction indicating that the transaction contained a non-existent address.

In an alternative embodiment, the interface port for internal packet bus link 435 may not have an address filter. In such a case, packet bus switch 430 may send all unclaimed packet transactions upstream via either of upstream packet bus links 415 and 425.

Packet bus switch 430 may determine to which upstream packet bus link to send a particular transaction. The determination may be dependent on several factors. In one example, if the upstream transaction is a response to a previous downstream request from a device such as processor 301A–D of FIG. 1, then the response may have an address corresponding to the requesting processor. Thus packet bus switch 430 may route the upstream transaction to the correct processor.

In another example, the upstream transaction is from an I/O master, such as a PCI-X device performing a memory read, packet bus switch 430 may decide which processor to route the request to. Thus, packet bus switch 430 may include programmable storage circuitry (not shown) which may store a look-up table or similar data structure that may identify which processor will handle particular types of transactions. In this case, the operating system may determine the contents of such a table and cause one or more of the processors to execute instructions to program packet bus switch 430. Accordingly, when an I/O master transaction is received by packet bus switch 430, the table may be used by packet bus switch 430 to determine to which processor the packet transaction will be routed.

In the event that the information in the look-up table becomes corrupted or is otherwise not current, an upstream packet transaction may be sent to the wrong processor according to the operating system. The incorrectly routed packet transaction may still eventually arrive at its intended destination. However, since the transaction may be routed through another processor first, a delay may be incurred. To prevent further incorrect routings, the receiving processor may initiate an error message. The error message may notify the operating system that the look-up table needs to be updated. The operating system may then schedule the look-up table update in accordance with its own priority scheme.

Alternatively, packet bus switch 430 may be configured to determine each processor's I/O load and to route transactions to the processor determined to have the smallest I/O load. Packet bus switch 430 may determine a processor's I/O load by checking the availability of storage space within a receive buffer at the particular processor host bridge or other receive logic. Packet bus switch 430 may then route a packet transaction to the processor having the most available receive buffer space.

Packet bus switch 430 may also be configured to receive downstream packet transactions from both internal packet bus links 415 and 425. Transactions may be received simultaneously from internal packet bus links 415 and 425. In addition, packet bus switch 430 may have pending transactions which are waiting for downstream events. Thus, packet bus switch 430 may include an arbitration circuit (not shown) at the downstream internal packet bus link interface which may use one or more common arbitration techniques such as a round robin approach, for example to arbitrate between transactions. In an alternative embodiment, the arbitration circuitry may be priority driven, with the priority of the destination being one of the key attributes during arbitration.

Figure 5:
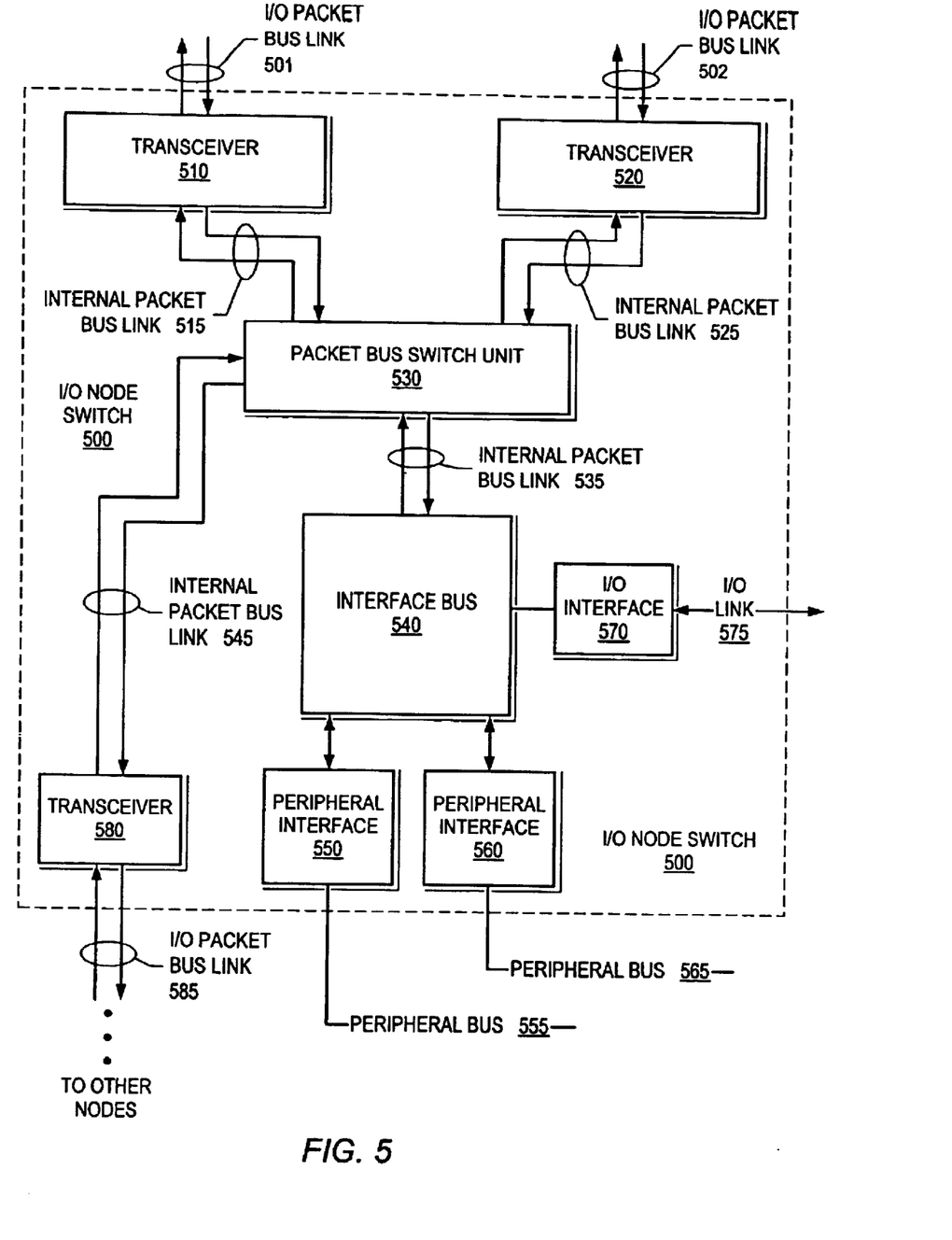
FIG. 5 is a block diagram of another embodiment of an I/O node switch.

Turning now to FIG. 5, a block diagram of an alternative embodiment of an I/O node switch is shown. I/O node switch 500 includes a pair of upstream transceivers 510 and 520 coupled to I/O packet bus links 501 and 502, respectively. I/O packet bus links 501 and 502 maybe coupled to upstream devices such as processors 301A–B of FIG. 1, for example. Transceivers 510 and 520 of FIG. 5 are also coupled to packet bus switch 530 via internal packet bus links 515 and 525, respectively. Packet bus switch 530 is coupled to interface bus 540 by internal packet bus link 535. Packet bus switch 530 is also coupled to downstream transceiver 580 via internal packet bus link 545. Transceiver 580 is coupled to I/O packet bus link 585 which may be connected to another I/O node or other device (not shown). Interface bus 540 is coupled to an I/O interface 570 and to peripheral interface 550 and 560. Peripheral interface 550 and 560 are coupled to peripheral buses 555 and 565, respectively. I/O interface 570 is coupled to I/O link 575.

It is noted that although the present embodiment depicts two upstream transceivers connected to two I/O packet bus links, it is contemplated that other embodiments may include other suitable numbers of upstream transceivers coupled to other suitable numbers of upstream I/O packet bus links.

Transceivers 510 and 520 include features similar to and operate in substantially the same way as the embodiment illustrated in FIG. 4. Therefore, for a description of the operation of transceivers 510 and 520, refer to the description of transceivers 410 and 420 in conjunction with FIG. 4 above.

It is noted that I/O interface 570 may be an integrated I/O controller and may include circuitry which implements a particular I/O device such as a Gigabit Ethernet™ controller or an Infiniband™ port controller, for example. In such embodiments, I/O link 575 may be an exemplary connection such as an Ethernet or an Infiniband™ connection. Peripheral buses 555 and 565 are examples of any suitable peripheral bus such as a Peripheral Component Interconnect (PCI) bus, or an Extended Peripheral Component Interconnect (PCI-X) bus, for example.

Packet switch unit 530 may be configured to receive upstream packet transactions upon internal packet bus link 535, decode an address of each transaction and determine which, if any, of the upstream paths to route each transaction. As will be described in greater detail below, if a given transaction contains an address which is not associated with one of the upstream internal packet bus links of packet bus switch 530, the packet transaction may be sent upstream.

Interface bus 540 may include internal packet bus architecture and circuitry (not shown) necessary to interconnect each of the internal packet bus links 535 and 545, the peripheral interfaces 555 and 565 and the I/O interface 570. For example, interface bus 540 may include interface ports (not shown) for internal packet bus link 535, I/O interface 570 and peripheral interface 550 and 560. Each interface port may include an address PA filter which is capable of claiming a given packet transaction having an address that matches a particular filter. Thus, interface bus 540 may be configured to provide peer-to-peer traffic support between each peripheral interface and I/O interface 570. For example, a packet transaction directed to peripheral interface 560 is transmitted upstream to interface bus 540 by peripheral interface 550. The packet transaction header may be decoded by each of the interface ports that are connected to interface bus 540. The decoded address matches the address filter of peripheral interface 560 and is thus claimed by peripheral interface 560. However, as will be described further below, a packet transaction targeted for an I/O node or other device connected to transceiver 580 via internal packet bus link 545 may first be routed upstream.

A packet transaction sent upstream by a given interface may not match any of the address filters in the interface ports. In such a case, packet bus switch 530 may send all unclaimed packet transactions upstream via either of upstream packet bus links 515 and 525. Thus, a packet transaction that is targeted for an I/O node or other device connected to transceiver 580 via internal packet bus link 545 may first be routed by packet bus switch 530 to a host bridge associated with one of processors 301A–B of FIG. 3. The host bridge may subsequently send the packet back downstream to packet bus switch 530 of FIG. 5, where the packet transaction may be routed to the I/O node or other device connected to transceiver 580.

In an alternative embodiment, packet bus switch 530 may recognize the destination address of the unclaimed packet transaction as being an address associated with an I/O node or other device connected to transceiver 580 via internal packet bus link 545. Thus, packet bus switch may be further configured to allow this type of peer-to-peer support.

Packet bus switch 530 may determine to which upstream packet bus link to send a particular transaction in substantially the same way as packet bus switch 430 of FIG. 4. Thus for a description of the remaining operation of packet bus switch 530 of FIG. 5., refer to the description of packet bus switch 430 of FIG. 4.

Numerous variations and modifications will become apparent to those skilled in the art once the above disclosure is fully appreciated. It is intended that the following claims be interpreted to embrace all such variations and modifications.

What is claimed is:

1. An input/output node switch for a multiprocessor computer system, said input/output node switch comprising:
   a bridge unit implemented on an integrated circuit chip coupled to receive a plurality of peripheral transactions from a peripheral bus and configured to transmit a plurality of upstream packet transactions corresponding to said plurality of peripheral transactions;
   a packet bus switch unit implemented on said integrated circuit chip coupled to receive said plurality of upstream packet transactions on an internal point-to-point packet bus link and configured to determine a destination of each of said plurality of upstream packet transactions;
   wherein said packet bus switch unit is further configured to route selected ones of said plurality of upstream packet transactions to a first processor interface coupled to a first point-to-point packet bus link and to route others of said plurality of upstream packet transactions to a second processor interface coupled to a second point-to-point packet bus link in response to determining said destination each of said plurality of upstream packet transactions.

2. The input/output node switch as recited in claim 1 further comprising a first transceiver unit coupled to receive said selected ones of said of said plurality of upstream packet transactions and to transmit said selected ones of said of said plurality of upstream packet transactions on said first point to point packet bus link.

3. The input/output node switch as recited in claim 2 further comprising a second transceiver unit coupled to receive said others of said plurality of upstream packet transactions and to transmit said others of said of said plurality of upstream packet transactions on said second point-to-point packet bus link.

4. The input/output node switch as recited in claim 3, wherein said packet bus switch unit is further configured to decode an address associated with each of said plurality of upstream packet transactions.

5. The input/output node switch as recited in claim 4, wherein said packet bus switch unit is further configured to block additional ones of said plurality of upstream packet transactions dependent upon said address.

6. The input/output node switch as recited in claim 5 further comprising a third transceiver unit coupled to receive said additional ones of said plurality of packet transactions dependent upon said address and to transmit said packet transactions on a third point-to-point packet bus link to another node.

7. The input/output node switch as recited in claim 6, wherein said third transceiver unit is further configured to receive a second plurality of upstream packet transactions on said third point-to-point packet bus link and to transmit said second plurality of upstream packet transactions to said packet bus switch.

8. The input/output node switch as recited in claim 7, wherein said packet bus switch unit is further configured to decode an address associated with each of said second plurality of upstream packet transactions, to route selected ones of said second plurality of upstream packet transactions to said first processor interface coupled to said first point-to-point packet bus link and to route others of said plurality of upstream packet transactions to said second processor interface coupled to said second point-to-point packet bus link dependent upon said address associated with each of said second plurality of upstream packet transactions.

9. The input/output node switch as recited in claim 3, wherein said packet bus switch unit is further configured to receive a first plurality of downstream packet transactions sent by said first processor interface and a second plurality of downstream packet transactions sent by said second processor interface.

10. The input/output node switch as recited in claim 9, wherein said packet bus switch unit is further configured to arbitrate between said first plurality of downstream packet transactions and said second plurality of downstream packet transactions.

11. The input/output node switch as recited in claim 10, wherein said packet bus switch unit is further configured to route said first plurality of downstream packet transactions and said second plurality of downstream packet transactions to said first internal point-to-point packet bus link.

12. The input/output node switch as recited in claim 11, wherein said bridge unit is further configured to decode an address of each of said first and said second plurality of downstream packet transactions and to initiate bus cycles corresponding to selected ones of said first and said second plurality of downstream packet transactions dependent upon said address.

13. The input/output node switch as recited in claim 1, wherein said packet bus switch unit is further configured to determine said destination of each of said plurality of upstream packet transactions using a programmable look up table.

14. The input/output node switch as recited in claim 3, wherein said packet bus switch unit is further configured to determine said destination of each of said plurality of upstream packet transactions using available buffer space counts corresponding to upstream devices coupled to said first and said second external packet bus links.

15. The input/output node switch as recited in claim 3, wherein said first, said second and said third point-to-point packet bus links are HyperTransport™ links each including a first set of uni-directional wires and a second set of uni-directional wires each configured to convey packets including control packets and data packets, wherein said control packets include command packets, info packets and response packets and wherein said control packets and data packets share the same wires.

16. A multiprocessor computer system comprising:
a first processor and a second processor each configured to execute programmed instructions;
an input/output node switch implemented on an integrated circuit chip coupled to said first processor by a first point-to-point packet bus link and coupled to said second processor by a second point-to-point packet bus link, wherein said input/output node switch includes:
a bridge unit coupled to receive a plurality of peripheral transactions from a peripheral bus and configured to transmit a plurality of upstream packet transactions corresponding to said plurality of peripheral transactions;
a packet bus switch unit coupled to receive said plurality of upstream packet transactions on an internal point-to-point packet bus link and configured to determine a destination of each of said plurality of upstream packet transactions;
wherein said packet bus switch unit is further configured to route selected ones of said plurality of upstream packet transactions to a said first processor via said first point-to-point packet bus link and to route others of said plurality of upstream packet transactions to said second processor via said second point-to-point packet bus link in response to determining said destination each of said plurality of upstream packet transactions.

17. The computer system as recited in claim 16, wherein said input/output node switch further comprising a first transceiver unit coupled to receive said selected ones of said of said plurality of upstream packet transactions and to transmit said selected ones of said of said plurality of upstream packet transactions on said first point to point packet bus link.

18. The computer system as recited in claim 16, wherein said input/output node switch further comprising a second transceiver unit coupled to receive said others of said plurality of upstream packet transactions and to transmit said others of said of said plurality of upstream packet transactions on said second point-to-point packet bus link.

19. The computer system as recited in claim 16, wherein said packet bus switch unit is further configured to decode an address associated with each of said plurality of upstream packet transactions.

20. The computer system as recited in claim 19, wherein said packet bus switch unit is further configured to block additional ones of said plurality of upstream packet transactions dependent upon said address.

21. The computer system as recited in claim 20, wherein said input/output node switch further comprising a third transceiver unit coupled to receive said additional ones of said plurality of packet transactions dependent upon said address and to transmit said packet transactions on a third point-to-point packet bus link to another node.

22. The computer system as recited in claim 21, wherein said third transceiver unit is further configured to receive a second plurality of upstream packet transactions on said third point-to-point packet bus link and to transmit said second plurality of upstream packet transactions to said packet bus switch.

23. The computer system as recited in claim 22, wherein said packet bus switch unit is further configured to decode an address associated with each of said second plurality of upstream packet transactions, to route selected ones of said second plurality of upstream packet transactions to said first processor coupled to said first point-to-point packet bus link and to route others of said plurality of upstream packet transactions to said second processor coupled to said second point-to-point packet bus link dependent upon said address associated with each of said second plurality of upstream packet transactions.

24. The computer system as recited in claim 18, wherein said packet bus switch unit is further configured to receive a first plurality of downstream packet transactions sent by said first processor and a second plurality of downstream packet transactions sent by said second processor.

25. The computer system as recited in claim 24, wherein said packet bus switch unit is further configured to arbitrate between said first plurality of downstream packet transactions and said second plurality of downstream packet transactions.

26. The computer system as recited in claim 25, wherein said packet bus switch unit is further configured to route said first plurality of downstream packet transactions and said second plurality of downstream packet transactions to said first internal point-to-point packet bus link.

27. The computer system as recited in claim 26, wherein said bridge unit is further configured to decode an address of each of said first and said second plurality of downstream packet transactions and to initiate bus cycles corresponding to selected ones of said first and said second plurality of downstream packet transactions dependent upon said address.

28. The computer system as recited in claim 16, wherein said packet bus switch unit is further configured to determine said destination of each of said plurality of upstream packet transactions using a programmable look up table.

29. The computer system as recited in claim 16, wherein said packet bus switch unit is further configured to determine said destination of each of said plurality of upstream packet transactions using an available buffer space count corresponding to each of said first processor and to said second processor.

30. The computer system as recited in claim 16, wherein said packet bus switch unit is further configured to route each of said plurality of upstream packet transactions to a given processor having a higher available buffer space count.

31. The computer system as recited in claim 21, wherein said first, said second and said third point-to-point packet bus links are HyperTransport™ links each including a first set of uni-directional wires and a second set of uni-directional wires each configured to convey packets including control packets and data packets, wherein said control packets include command packets, info packets and response packets and wherein said control packets and data packets share the same wires.

* * * * *